United States Patent [19]
Cohen

[11] 3,734,802
[45] May 22, 1973

[54] APPARATUS FOR LEACHING GLASS FILMS

[75] Inventor: Charles I. Cohen, Granville, Ohio

[73] Assignee: Owens-Corning Fiberglas Corporation, Toledo, Ohio

[22] Filed: Mar. 19, 1971

[21] Appl. No.: 126,246

Related U.S. Application Data

[62] Division of Ser. No. 726,305, May 3, 1968, Pat. No. 3,615,958.

[52] U.S. Cl..................................156/345, 65/31
[51] Int. Cl..............................................C03c 15/00
[58] Field of Search..........................156/345, 24; 134/184; 118/428, 429; 65/31

[56] References Cited

UNITED STATES PATENTS

| | | | |
|---|---|---|---|
| 206,392 | 7/1878 | Dithridge | 156/345 |
| 3,095,463 | 6/1963 | Chang et al. | 156/345 X |

Primary Examiner—J. Steinberg
Attorney—Staelin & Overman

[57] ABSTRACT

Apparatus and method for leaching films including a container having within it means for supporting the film in inclined disposition during introduction and removal of heated fluids.

6 Claims, 3 Drawing Figures

Patented May 22, 1973

3,734,802

INVENTOR.
CHARLES I. COHEN
BY
ATTORNEYS

APPARATUS FOR LEACHING GLASS FILMS

This is a division of application Ser. No. 726,305, filed May 3, 1968 now U.S. Pat. No. 3,615,958.

BACKGROUND OF THE INVENTION

Heretofore most commercial semipermeable membranes have been organic cellulose type membranes such as cellulose acetate and nitrocellulose. The physical characteristics of such cellulose type membranes give rise to difficulties that limit their use and effectiveness.

The organic nature of the cellulose type membranes limits their use primarily to aqueous solutions. Many organic solvents such as acetones, esters, ketones, and many alcohols attack cellulose type membranes to dissolve them. Even in aqueous solutions the cellulose type membranes can normally operate only in a narrow pH range, e.g. from 4 to 6. In many cases the cellulose type membranes require chemical modification to work in a particular chemical environment. In contrast, many solvents that attack cellulose type membranes do not affect the semipermeable membranes of the instant invention; moreover, the semipermeable membrane of the invention operates in aqueous solutions over a wider pH range.

Many types of micro-organisms attack the organic cellulose type membranes. Moreover, the cellulose type membranes can hydrolyze under operating pressures to the point where they structurally fail.

Because of their organic structure, cellulose type membranes are not completely dimensionally stable. These membranes are flexible and are characterized by linear polymer chains having only some degree of cross-linking between them. During their use under conditions of pressure the organic cellulose type membranes lose their dimensions with an ensuring distortion of the pore system. On the other hand, the semipermeable membranes of the present invention have a rigid structure that gives long term dimensional stability under pressure and substantially uniform solute rejection values.

SUMMARY OF THE INVENTION

An object of the present invention is an improved selective membrane and method and apparatus for making it.

Another object of the present invention is an inorganic selective or semipermeable membrane that removes substantially all dissolved matter from fluids diffusing through it.

Yet another object of the present invention is to provide a selective or semipermeable membrane compatible with a wide range of chemical environments.

Still another object of the invention is an improved method and apparatus for leaching films such as inorganic glass films.

These and other objects are attained through the use of a selective or semipermeable membrane that is an integral porous structure comprising essentially silica, the membrane being made by leaching certain thin inorganic glass films.

The selective membrane of the invention takes its origin from the particular structure of the inorganic glass used. Suitable inorganic glass must possess a fine structure having a point to point chemical variation where the composition of the leachable components follows a continuous function with a maximum and minimum concentration on the order of 50 angstroms. The leachable components include a silica-rich network and an alkaline earth-rich network. The alkaline earth-rich network is removed, e.g. leaching, to leave behind a highly porous membrane structure of essentially silica. This integral silica structure is a membrane possessing a coherent pore or channel network where the individual pores of the network are exceedingly small in diameter. Thermal treatment of the solid inorganic glass prior to leaching modifies the maximum and minimum concentrations and the distance between such maximum and minimum concentrations to produce a porous membrane, which is essentially silica having a pore diameter greater than the inorganic glass having no such thermal treatment. Thus, selective thermal treatment of the inorganic glass prior to leaching can control the membrane's pore size.

The semipermeable membrance of the invention provides an inorganic selective membrane that can be used in a wider variety of chemical environments than known organic semipermeable membranes, especially cellulose type membranes. Because of its inorganic structure, the semipermeable membranes of the invention resist the attack of most solvents. Additionally, the membranes find use in aqueous solutions over a wider range of pH, e.g. 2 – 8. Moreover, the inorganic structure of the semipermeable membrane of the invention is ideal in ultrafiltration applications for separating micro organisms such as viruses from liquids in which they are found. Advantageously, the fine structure of the glass employed to make the glass film provides, upon leaching, a membrane having an extremely small pore or chemical size, which under ultrafiltration conditions removes or separates substantially all except the most minute dissolved matter.

The leaching techniques of the invention make possible leaching of thin films such as inorganic glass films. Film breakage during leaching is reduced and leached films without flaws, e.g. cracks, are produced.

The semipermeable inorganic membrane of the invention finds use as an osmotic or reverse osmotic membrane ideal for renovating water, e.g. recovery of fresh water from seawater.

DESCRIPTION OF THE PREFERRED EMBODIMENTS

Figure 1:
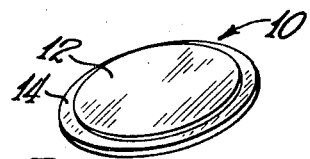
FIG. 1 is a view in perspective showing a supported selective membrane according to the principles of the invention.

U. S. Pat. No. 2,509,805 issued to Games Slayter on May 30, 1950, shows apparatus for forming ribbons or continuous films of glass suitable for use in making the selective or semipermeable membrane of the invention. As disclosed in the patent, molten glass flows from a container of molten glass through a relatively long orifice or slot located in the bottom of the container. Pulling means attenuates the thin and relatively wide streams of molten glass flowing from the slot into an exceedingly thin continuous film or sheet of glass.

The selective or semipermeable membrane of the invention depends upon an inorganic glass with a fine structure having a point to point chemical variation where the composition of the leachable components follows a continuous function with a maximum and minimum concentration on the order of 50 angstroms. Examples of useful glass compositions suitable for producing a glass film from which the membrane of the invention may be made are as follows:

EXAMPLE I

| | Wt. Percent |
|---|---|
| CaO | 16 to 19 |
| MgO | 3 to 6 |
| $Al_2O_3$ | 12 to 16 |
| $SiO_2$ | 52 to 56 |
| $B_2O_3$ | 9 to 11 |

EXAMPLE II

| | Wt. Percent |
|---|---|
| $SiO_2$ | 60.0% |
| BaO | 22.0% |
| $B_2O_3$ | 18.0% |

EXAMPLE III

| | Wt. Percent |
|---|---|
| CaO | 0.5% |
| $K_2O$ | 1.4% |
| $Li_2O$ | 0.5% |
| $Al_2O_3$ | 0.1% |
| $SiO_2$ | 73.8% |
| $B_2O_3$ | 22.8% |
| $Na_2O$ | 1.0% |

The structure of the glass film is to be distinguished from glass that exhibits distinct phase separation wherein there is an interface between the phase. The attenuated inorganic glass film of a glass composition having the required fine structure includes a silica-rich network and an alkaline-earth-rich network in a microlevel beginning state of chemical separation that gives rise to two interconnected networks. Moreover, the separation growth is slower than the quenching rate of film production, e.g. film attenuation. Because there is a drastic temperature drop during attenuation of the inorganic glass film, chemical separation only begins.

During attenuation of the inorganic glass film the temperature of the glass may drop from a molten temperature of over 2,000° F in the container to a temperature generally below 1,2000° F at only 6 to 8 inches from the bottom of the container.

While attenuated inorganic glass films suitable for making the selective membrane of the invention having a thickness in the range of from ten one hundred thousandths of an inch to one hundred one thousandths of an inch can be made by attenuating the film at the high linear rates of speed mentioned in U. S. Pat. No. 2,509,805, it has been useful to attenuate the films at a linear rate of speed of from 20 to 200 feet per minute, or slightly more, where the temperature of the molten glass in the container is from 2,100° to 2,400° F.

Removal of the alkaline-earth-rich components by leaching leaves an integral and porous membrane structure of essentially rigid silica, i. e. 96 to 99 percent silica. Normally the alkaline-earth-rich phase removal is accomplished by acid leaching, using an acid in which the alkaline-earth-rich components have much greater solubility than the silica-rich component and which leaves no insoluble residue. The rate of such component removal in an acid is determined by such things as the chemical nature of the acid itself, the acid concentration, temperature of the acid bath and the like.

Hot concentrated acid gives the highest rate of component removal. It has been found useful to employ heated 38 percent hydrochloric acid diluted with an equal weight of water at an initial temperature around 180° F.

The leached inorganic glass film is a semipermeable membrane typified by a highly hydrated rigid silica framework. The membrane possesses a hydrated, interconnected pore or coherent channel network occupying in the range of from 35 to 40 percent of the membrane's volume. The pore or channel size is in the range of from 30 to 50 angstroms in diameter. The water of hydration is believed to be located on the surface of the pore walls and is strongly held thereon by residual electrolytic forces.

The thinness of the inorganic glass film is important. The efficient removal of the alkaline-earth-rich, acid soluble component by leaching is increasingly difficult for film thicknesses greater than forty one hundred thousandths of an inch. Because the external, initially leached portions of an inorganic glass film having a thickness greater than forty one hundred thousandths of an inch apparently reduce the strength of the film to where it cannot accomodate the resultant stresses during leaching of the interior portions of the film, such films tend to fail during leaching. Further, because acceptable and useful flux rates through semipermeable membranes of the invention having a thickness greater than forty one hundred thousandths of an inch is greatly reduced and require exaggerated pressures, films of such thicknesses are not normally used. Moreover, an inorganic glass film less than ten one hundred thousandths of an inch is too fragile for handling. It is preferred that the selective membrane of the invention be made from suitable inorganic glass films having a thinness of from twenty to thirty one hundred thousanths of an inch.

Suitable cutting means may be employed to shape a portion of the attenuated continuous suitable inorganic glass film to desired dimensions. While one may use cutting dies, flame cutting and the like, the use of thermal imaging cutting apparatus is preferred to form the glass film into desired dimensions.

Because the inorganic glass film is delicate, a substrate is used to support it for handling. The film is normally placed in intimate supported relationship on the substrate prior to leaching the film. The intimate association of the substrate and film inhibits movement of the film on the substrate during leaching and subsequent thereto. While the film and substrate may be suitably secured together by adhesives such as solder glass to fix the inorganic glass film on the substrate, it has been found that the surface tension of water on the surface of a substrate such as glass fiber filter paper is sufficient to firmly hold the film on the paper during leaching and subsequent thereto.

Any suitable leaching methods may be employed to remove the alkaline-earth-rich component for making the porous and essentially silica membrane of the invention.

FIG. 1 shows a circular composite structure 10 comprising a leached inorganic film 12, i.e. separation or semipermeable membrane, and supporting substrate 14 because the glass film can move somewhat on the substrate 14 during leaching, the substrate 14 is larger, i.e. has a larger diameter.

The substrate 14 is a porous structure having larger size pores or channels than that of the selective membrane 12. Moreover, while the pore size may remain constant throughout the entire volume of the substrate 14, a substrate having a coherent network of increasing pore size at more remote positions from the surface of the substrate contacting the membrane 12 may be employed. Because the inorganic glass film from which the membrane is produced is normally placed in intimate supported relationship on the substrate 14 prior to leaching, the substrate 14 should be inert to acid. Glass fiber filter paper has proven to be an excellent supporting substrate for use with the membrane 12. Subjecting the glass filter paper to the acid used for leaching the inorganic glass film prior to combining the paper with the glass film provides a support permitting enhanced leaching of the film. Such exposure removes any portion of the filter paper, e.g. binders, that may detract from the leaching of the inorganic glass film. A standard glass fiber filter paper of one sixty-fourth to one-sixteenth of an inch thickness has given good results.

Figure 2:
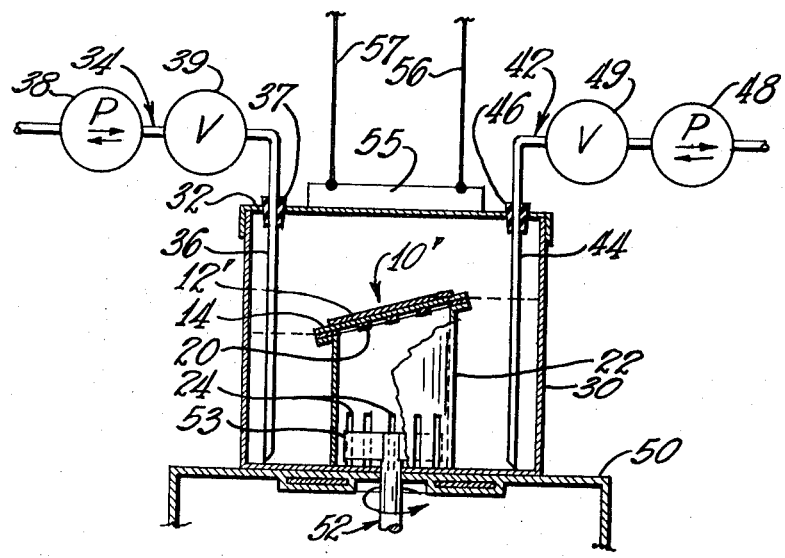
FIG. 2 is a sectional view in elevation of apparatus for leaching films such as inorganic glass films according to the principles of the invention.

Somewhat schematically shown in FIG. 2 is apparatus for acid leaching a thin inorganic glass film, which is supported on leached glass fiber filter paper. As illustrated, located on the upper surface of a porous disc 20 of a tubular support 22 within a container 30 is a composite 10' including a thin inorganic glass film, denoted as 12', and the leached glass fiber filter paper substrate 14. A cover 32 fits snugly across the upper end of the container 30 to close it.

Fluid carrying means provides acid to the container 30. A tube 34 connected to an acid source (not shown) carries heated acid, e.g. hydrochloric acid, to and from the container 30. The tube 34 includes a vertically downwardly extending tube portion 36 that enters into the container 30 by a feed through means 37 located in the cover 32. The vertical tube portion 36 extends downwardly to terminate at the bottom of the container 30. A suitable pump means such as a tube pump 38 located along the length of the tube 34 moves the acid to and from the container 30. A valve means 39 controls the flow of acid between the container 30 and the acid source in the tube 34.

Fluid carrying means provides steam or distilled water to the container 30. A tube 42 connected to a steam or distilled water source (not shown) carries such fluid to and from the container 30. The tube 42 has a vertically downwardly extending tube portion 44 that enters into the container 30 by a feed through means 46 located in the cover 32. The tube portion 44 extends downwardly to terminate at the bottom of the container 30. Appropriate means such as a tube pump 48 moves the steam or distilled water to and from the container 30. A valve means 49 controls the flow of fluid between the container 30 and water or steam source in the tube 42.

A heating means such as a hot plate 50 on which the container 30 rests keeps the fluid in the container 30 at desired temperatures.

Located within the container 30 at its bottom and within the tubular support 22 is the stirring bar 53 of a stirring means 52. The bar 53 rotates to move liquid within the container 30, viz. within the tubular support 22.

The cover 32 can be heated to a desired temperature. As shown in FIG. 2, a suitable source provides electrical current to a heating means 55 by electrical lines 56 and 57 to heat the cover 32. Any suitable heating means may be employed.

Because the upper end of the support tube 22 is inclined, the porous disc 20 and the composite of the glass film 12' and glass fiber filter paper substrate 14 are also inclined the same amount. Normally the inclination is from less than 1° to 5°. Greater inclinations may be required under certain circumstances.

At the lower end of the tubular support 22 are openings such as vertical slots 24, which permit fluid introduced into the container 30 through the tubes 34 and 42 to enter within the tubular support 22.

In operation the composite 10' of the inorganic glass film 12' and the leached glass fiber filter paper 14 receives an initial aqueous treatment prior to acid exposure to lessen the initial ardent contact of the acid.

The aqueous treatment covers the composite 10' to bring the temperature of the inorganic glass film 12' and paper 14 to substantially the predetermined temperature of the subsequently introduced leaching acid, normally 140° to 180° F. In practice either distilled water or steam may be introduced into the container 30, e.g. through the tube 42. The steam raises the temperature within the container 30 to a predetermined value. Some of the steam condenses on the inorganic glass film 12' and paper 14 to cover their surfaces with water; the temperature of the film 12' and paper 14 raises substantially to the temperature of the acid subsequently introduced into the container 30. Normally it takes from 10 to 15 minutes using steam to bring the temperature of the composite 10' to a desired value. If distilled water heated to a predetermined temperature fills in the container 30 to immerse the composite 12', the temperature of the film 12' and substrate 14 is also normally brought within 10 to 15 minutes to the temperature of the subsequently introduced acid. The tube 42 siphons the water from the container through operation of the tube pump 48.

After aqueous treatment, heated acid enters the container 30 through the tube 34. The tube pump 38 advances the acid into the container 30. While suitable acids may be employed such as acetic and nitric, good results obtain employing hot hydrocloric acid. Normally the acid enters the container 30 at an initial temperature of from 140° to 180° F, an initial temperature of 180° F is being preferred. A 38 percent hydrochloric acid diluted with an equal weight of water gives good leaching results. The hot plate 50 keeps the acid at desired temperature.

Referring again to FIG. 2, the level of the acid bath, as indicated by the dotted lines, raises to the upper surface of the inclined porous support disc 20. Although the disc 20 is somewhat inclined, from the horizontal (from less than 1° to 5° or more), i.e. inclined from the longitudinal axis of the tubular support 22 normally from 85° to greater than 89°, the surface of the liquid acid adapts by means of surface tension and raises to the upper surface of the disc 20 at all points about its periphery. Thus, the acid level is below the glass film 12'. The heated acid introduced into the container 30 passes through the slots 24 to invade the interior of the tubular support 22 and raises to follow the level of the acid bath outside the tubular support 22. Because the level of the acid bath is at the upper surface of the porous support disc 20, the acid within the tubular support 22 raises to fill the pores of the disc 20, acid thereby contacting the lower surface of the leached glass fiber filter paper substrate 14.

The acid reaches the glass film 12' through the pores of the filter paper substrate 14. The acid raises from the disc 20 through the filter paper 14 to the lower surface of the glass film 12' by capillary action.

The temperature of the acid is normally varied during the leaching of the glass film 12'. The initial temperature of the acid in the container 30 is kept constant during the first half of the leaching process. The temperature of the acid is gradually reduced a predetermined amount during the second half of leaching, usually a reduction of from 30° to 40° F. being adequate, to slow down the leaching process. Thus the leaching is more rapid during the initial period. Good results have been obtained using the following conditions.

EXAMPLE V

| | |
|---|---|
| Glass film thickness | 28 × 10-5 inches |
| Initial acid temperature | 180° F. for 20 minutes |
| Final temperature | 140° F., a gradual reduction |
| from 180° F. over 20 minutes | |

The leached inorganic glass film, now semipermeable membrane 12, is washed with distilled water.

During the leaching process care should be taken to preclude condensation of acid vapors on the upper surface of the film 12'. The warm atmosphere within the container 30 is acid vapor saturated, e.g. hydrochloric acid vapor saturated, during leaching these acid vapors promote leaching from the upper surface of the film 12'. Through the heating means 55 the cover 32 is kept at the vapor temperature within the container 30, acid condensation on the inside surface of the cover 32 being inhibited. Any acid condensation on the inside surface of the cover 32 could fall in the form of drops onto the upper surface of the glass film 12' with detrimental effect to the leaching of the inorganic glass film 12'. However, any condensation that may occur on the upper surface of the film 12' will tend to roll off because of film's inclined disposition on the disc 20 at the upper end of the tubular support 22. It has been found that an inclination of from less than 1° to 5° is adequate to clear the upper surface of the film 12' of any acid condensation.

When leaching is completed, the pump 38 siphons the acid from the container 30 through the tube 34 and one can remove the leached glass film or semipermeable membrane 12 on the substrate 14 from the container 30 for washing with distilled water and subsequent use.

Thermal treatment of the inorganic glass film of the invention prior to removal of the alkaline-earth-rich component induces increased chemical separation of the leachable components to modify the maximum and minimum concentrations and the distance between such maximum and minimum concentrations. The thermal treatment of the inorganic glass film of the invention falls within a temperature range. It appears that the lower limit of induced chemical separation occurs within the range of from 1,200° to 1,340° F. When the inorganic glass film is subjected to such temperature over a period of time, the leached glass film or essentially silica semipermeable membrane has a pore size of from generally 80 angstroms to 500 angstroms, in diameter. The inorganic glass film has been treated as indicated with the ensuing membrane pore diameter as shown:

EXAMPLE VI

| | |
|---|---|
| Temperature | 1,320° F |
| Time | 72 hours |
| Pore diameter of membrane | 300 angstroms |

Time and temperature variations modify the pore diameter.

The upper limit is a visible region of separation in the range of from 1,340° to 1,380° F. The glass film appears somewhat opaque from the chemical separation. When one removes the alkaline-earth-rich component by leaching, there remains a porous and essentially silica membrane having a pore diameter in the range of from 500 to 800 angstroms depending upon the particular thermal treatment.

For example:

EXAMPLE VII

| | |
|---|---|
| Temperature | 1,380° F |
| Time | 72 hours |
| Pore diameter of membrane | 600 angstroms |

Time and temperature variations modify the pore diameter.

Figure 3:
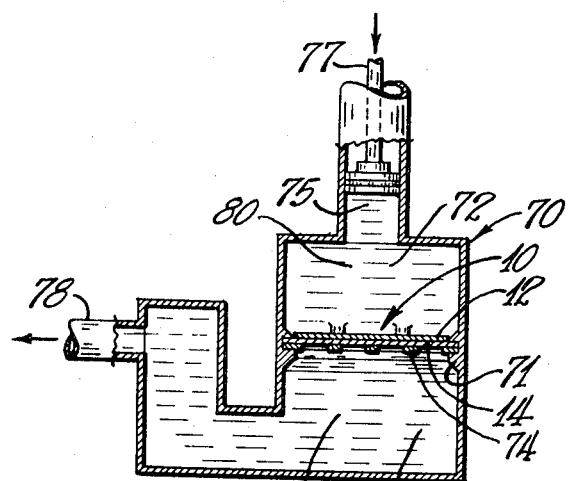
FIG. 3 is a somewhat schematic view in elevation of apparatus of an ultrafiltering process according to the principles of the invention.

FIG. 3 shows a somewhat schematic ultrafiltration, i.e., reverse osmosis, process employing the semipermeable membrane 12. The filter means comprises a porous support means 74 of adequate strength and made of things such as sintered metal or porous ceramic that supports the composite structure 10 of the inorganic member 12 and substrate 14 within a container 70. With the aid of a suitable sealing means 71 the composite structure 10 in intimate association on the support means 20 divides the container 70 into an upper compartment or chamber 72 and a lower compartment or chamber 73. An extension portion 75 communicates with the upper chamber 72. Associated with the extension portion 75 is a piston unit 77 moveable therein. A discharge 78 communicates with the lower chamber 73.

The upper chamber 72 holds a liquid 80 to be filtered through the semipermeable membrane 12, which forms a wall of upper chamber 72. The liquid 80 may be a liquid including dissolved organic solids such as sucrose in water. Also, the liquid 80 may be a liquid mixture such as an emulsion of oil and water or perhaps a liquid containing ionic solids such as sodium chloride in water.

The piston unit 77 moved by appropriate means exerts pressure on the liquid 80. When the unit 77 established sufficient pressure in excess of osmotic pressure on the liquid 80, diffusion through the membrane 12 occurs. Flow continues through the substrate 14 and support means 74. Filtered or treated liquid, denoted as 81, collects in the lower chamber 73. The collected filtered liquid 81 may leave the lower chamber 73 through the discharge 78. Components of the liquid 80 not passing through, i. e. rejected, by the membrane 12 remain in chamber 72.

One can produce a semipermeable membrane for particular ultrafiltering tasks. One need only thermally treat the inorganic glass film to modify the chemical separation of the leachable components to obtain a leached inorganic membrane having a desired pore diameter.

In view of the foregoing, it will be recognized that while particular embodiments of the invention have been shown, many modifications may be made within the scope of the invention; therefore, it is not the intent to limit the invention to the specific embodiments.

I claim:

1. Apparatus for acid leaching an inorganic glass film comprising:

a container;

a first fluid carrying means for introducing and removing heated fluid from the container;

a second fluid carrying means for introducing and removing liquid acid from the container;

a tubular support means within the container extending from one interior wall surface of the container and having openings through which fluid introduced into the container may enter;

a porous support disc upon which a film to be leached is rested closing the end of the tubular member spaced from the surface from which the tubular member extends, the tubular member adopted to incline the porous support disc with respect to the longitudinal axis of the tubular member; and mean for heating fluid introduced in the container.

2. Apparatus for leaching film comprising:

a container;

means within the container for support of film to be leached including a porous member having an upper surface on which the film is rested during leaching and a lower surface at the opposite side of the member and support means holding the porous member in an inclined position to the horizontal effective to permit liquid supplied to the container to directly contact the lower surface; and means for controllably supplying leaching liquid to the container to a level at the upper surface of the member in the container, liquid being supplied to the upper surface from liquid that has moved through the porous member from the lower surface.

3. Apparatus recited in claim 2 in which the support means holding the porous member is a hollow body on the bottom of the container, the body having an upper opening communicating with its interior and at least one lower opening to permit liquid supplied to the container to enter interiorly of the body, the porous member closing the upper opening.

4. Apparatus recited in claim 3 in which the hollow body is a tubular member.

5. Apparatus recited in claim 2 wherein the porous member is inclined not greater than 5° from the horizontal.

6. Apparatus recited in claim 4 further comprising means within the tubular member for stirring liquid supplied to the container.

* * * * *